United States Patent [19]

Hirabayashi et al.

[11] Patent Number: 5,073,673
[45] Date of Patent: Dec. 17, 1991

[54] PROCESS FOR THE PRODUCTION OF HIGH-OCTANE GASOLINE BLENDING STOCK

[75] Inventors: Kazuo Hirabayashi, Yokohama; Tadami Kondoh; Hiroaki Nishijima, both of Ebina; Shinichi Inoue, Yokohama; Kouji Adachi, Tokyo; Fumiho Igarashi, Yokohama; Toshio Wakai, Kawasaki, all of Japan

[73] Assignee: Research Association for the Utilization of Light Oil, Japan

[21] Appl. No.: 530,583

[22] Filed: May 30, 1990

[30] Foreign Application Priority Data

May 31, 1989 [JP] Japan ................................. 1-140105

[51] Int. Cl.$^5$ .............................................. C07C 12/02
[52] U.S. Cl. .................................... 585/415; 585/417; 585/418
[58] Field of Search ........................ 585/415, 417, 418

[56] References Cited

U.S. PATENT DOCUMENTS

| | | | |
|---|---|---|---|
| 4,579,988 | 4/1986 | Kieffer | 585/415 |
| 4,607,805 | 8/1986 | Chang et al. | 585/415 |
| 4,613,716 | 9/1986 | McNiff | 585/415 |
| 4,620,921 | 11/1986 | Change et al. | 585/415 |
| 4,629,818 | 12/1986 | Burress | 585/415 |
| 4,654,455 | 3/1987 | Chao | 585/415 |
| 4,766,264 | 8/1988 | Bennett et al. | 585/415 |
| 4,766,265 | 8/1988 | Desmond et al. | 585/415 |
| 4,795,845 | 1/1989 | Martindale et al. | 585/415 |
| 4,808,763 | 2/1989 | Shum | 585/415 |
| 4,855,522 | 8/1989 | Diaz | 585/415 |
| 4,861,934 | 8/1989 | Suzuki et al. | |
| 4,891,463 | 1/1990 | Chu | |

FOREIGN PATENT DOCUMENTS 0204236 5/1986 European Pat. Off. .
0230356 8/1987 European Pat. Off. .

Primary Examiner—Helane E. Myers
Attorney, Agent, or Firm—Lorusso & Loud

[57] ABSTRACT

A high-octane gasoline is produced by the conversion of a light hydrocarbon containing $C_2$-$C_7$ paraffins and/or $C_2$-$C_7$ olefins using a crystalline aluminogallosilicate containing about 0.1–2.5% by weight of aluminum and about 0.1–5% by weight of gallium in the skeleton thereof and having a particle size in the range of about 0.05–20 μm, with at least 80% by weight of the crystalline aluminogallosilicate having a particle size of 0.1–10 μm.

11 Claims, No Drawings

PROCESS FOR THE PRODUCTION OF HIGH-OCTANE GASOLINE BLENDING STOCK

This invention relates to a process for the production of high-octane gasoline containing aromatic hydrocarbons as a major component from a light hydrocarbon.

Heretofore, the catalytic reforming of naphtha using a platinum aluminum catalyst has been extensively employed for the preparation of a high-octane gasoline. Naphtha to be used as a raw material is usually from fractions having boiling points in the range from 70° C. to 180° C., when intended to be used for the preparation of gasoline for use in automobiles and from fractions having boiling points in the range from 60° C. to 150° C., when intended to be used for the preparation of BTX. It is difficult to produce a high-octane gasoline from a light hydrocarbon containing paraffins and/or olefins having from 2 to 7 carbon atoms because the rate for the conversion to aromatic hydrocarbons may be decreased to remarkably low levels as the number of carbon atoms is decreased. At the present time, light hydrocarbons are used only in very limited ranges as raw materials in the field of petrochemistry and for the preparation of city gases. Therefore, a technology designed to be applied to produce high-octane gasolines from light hydrocarbons would be valuable.

Several methods have been proposed for the production of high-octane gasolines from light hydrocarbons, using proton-type ZSM-5, a proton-type aluminosilicate of an MFI structure having loaded thereon Ga by impregnation or ion-exchange, and a proton-type gallosilicate of an MFI structure of catalysts.

Japanese Published Unexamined Patent Application No. 62-254847 suggests that a proton-type, crystalline aluminogallosilicate has improved property as a catalyst for the production of aromatic hydrocarbons over ZSM-5, Ga-loaded ZSM-5 or crystalline gallosilicates.

Japanese Published Unexamined PCT Application No. 60-501357 discloses a proton-type or ammonium-type galloaluminosilicate of an MFI structure modified by treatment with steam. According to the teachings in this publication, gallium is preferentially removed from the skeletal structure of the galloaluminosilicate by the treatment with steam and this gallium deposits perhaps as oxide on the surface or within the pores of the silicate. The steam-treated galloaluminosilicate is taught to exhibit the same catalytic activity for conversion of propane into aromatic hydrocarbons as aluminosilicate impregnated or ion-exchanged with gallium. This publication further describes that the steam-treated galloaluminosilicate is superior to non-treated one as a catalyst for the conversion of propane or n-butane into aromatic hydrocarbons.

The present inventors have found that the steam-treated galloaluminosilicate does not have satisfactory catalyst life and the catalytic activity thereof gradually decreases when used for a long period of time. This is considered to be attributed to (a) structural defects in the steam-treated galloaluminosilicate caused by the removal of a quantity of aluminum by hydrolysis of tetrahedral aluminum during the treatment with steam and (b) gradual loss of gallium deposits upon contact with hydrogen during the catalytic conversion reaction which involves dehydrogenative cyclization.

Japanese Published Unexamined Patent Application No. 62-254847 by the present inventors discloses a proton-type aluminogallosilicate of an MFI structure useful as catalyst for the conversion of light hydrocarbons into aromatic hydrocarbons. With this aluminogallosilicate, there encounters no problem of loss of gallium during contact with hydrogen. However, the conversion to aromatics gradually decreases when the catalyst is used for a long period of time. In the conversion of light hydrocarbons into aromatic hydrocarbons on an industrial-scale, it is important that the conversion to aromatics should be high and remain unchanged. A catalyst which has extremely high initial activity but which is susceptible to catalytic poisoning such as caused by coke is ill-suited as catalyst to be used on an industrial-scale.

The present invention has been made in view of the foregoing problems of the conventional techniques and is contemplated to provide a process which can yield high-octane gasoline with a high yield and a high conversion for a long period of service.

In accordance with one aspect of the present invention there is provided a process for the production of a high-octane gasoline, wherein a light hydrocarbon containing one or more paraffins and/or olefins, each having 2 to 7 carbon atoms, is contacted in a reaction zone with a catalyst containing a crystalline aluminogallosilicate at a temperature of 350°–650° C. under a hydrogen partial pressure of not higher than 5 kg/cm$^2$, thereby obtaining a high-octane gasoline-containing product, characterized in that said crystalline aluminogallosilicate has a particle size in the range of about 0.05–20 μm, that at least 80% by weight of said crystalline aluminogallosilicate has a particle size in the range of 0.1–10 μm and that said crystalline aluminogallosilicate contains about 0.1–2.5% by weight of aluminum and about 0.1–5% by weight of gallium in the skeleton thereof.

In another aspect, the present invention provides a process for the production of a high-octane gasoline, wherein a light hydrocarbon containing one or more paraffins and/or olefins, each having 2 to 7 carbon atoms, is contacted in a reaction zone with a catalyst containing a crystalline aluminogallosilicate at a temperature of 350°–650° C. under a hydrogen partial pressure of not higher than 5 kg/cm$^2$, thereby obtaining a high-octane gasoline-containing product, characterized by the steps of separating a light fraction containing methane and/or ethane as a major component from said high-octane gasoline-containing product, and recycling said light fraction to said reaction zone.

The present inventors have found that the catalytic performance of a crystalline aluminogallosilicate varies with the particle size thereof even if there is no difference in X-ray diffraction and that a crystalline aluminogallosilicate with a specific range of the particle size exhibits high catalytic activity for a long process time.

The present invention will now be described in detail below.

The terms "high-octane gasoline blending stock" and related ones used in the present specification refer to hydrocarbons having an octane number of 95 or higher, when determined by the research method, and containing a large quantity of aromatic hydrocarbons with carbon atoms in the range from 6 to 10. The high-octane gasoline may be used as automobile fuel and for the preparation of aromatic hydrocarbons. The term "light hydrocarbons" used herein as raw materials for the preparation of high-octane gasoline refers to hydrocarbons containing a paraffin and/or an olefin with carbon atoms ranging from 2 to 7 as a major constituent. Representative of light hydrocarbons are light fractions having boiling points of 100° C. or lower obtainable from naphtha fractions containing a paraffin with carbon atoms ranging from 5 to 7 as a major constituent.

The crystalline aluminogallosilicate according to the present invention may be produced by the gel crystallization method using hydrothermal synthesis or by the method of inserting gallium into the lattice skeleton of an aluminosilicate or inserting aluminum into the lattice skeleton of a gallosilicate.

The gel crystallization method is simpler because an objective quantity of aluminum and gallium can be contained at the same time in the preparation of the crystalline aluminogallosilicate. A crystalline aluminogallosilicate may be produced by this method by subjecting a finely divided aqueous mixture containing a silica source, an alumina source and a gallia source as an essential constituent, in addition to a constituent necessary for the silicate synthesis, to conditions for the hydrothermal synthesis.

As sources of silica may be used, for example, a silicate such as sodium silicate or potassium silicate, colloidal silica, silica powder, dissolved silica and water glass.

As sources of alumina are used, for example, an aluminum salt such as aluminum sulfate or aluminum nitrate, an aluminate such as sodium aluminate, and aluminum gel.

As sources of gallia are used, for example, a gallium salt such as gallium nitrate or gallium chloride, and gallium oxide. As a further source of alumina or gallia, there may be used a solution or a hydroxide containing aluminum or gallium obtainable during the extraction or purification step of a deposit such as a bauxite deposit, zinc deposit or the like.

An organic additive may also be used in order to accelerate the growth of a desired crystalline aluminogallosilicate and to improve the purity thereof, thus yielding products of better quality. As organic additives useful in this method are, for example, quaternary ammonium salts such as tetrapropylammonium salt, a tetrabutyl-ammonium salt or a tripropylmethylammonium salt, an amine such as propylamine, butylamine, aniline, dipropylamide, dibutylamide or morpholine, an aminoalcohol such as ethanolamine, diglycolamine or diethanolamine, an alcohol such as ethanol, propylalcohol, ethylene glycol or pinacol, an ester, an organic acid, an ether, a ketone, an amino acid, a thioalcohol and a thioether. A compound that produces such organic additives under the hydrothermal synthesis conditions may also be used.

As a source of an alkali metal or an alkaline earth metal, there may be used, for example, a hydroxide, a halide, a sulfate, a nitrate or a carbonate of an alkali metal such as sodium or potassium or an alkaline earth metal such as magnesium or calcium. The raw material may contain a mineral acid such as sulfuric acid or nitric acid as a pH adjusting agent, in addition to the above-described compounds.

An aqueous mixture containing one or more of the above-described compounds to be used as a raw material may be subjected to crystallization at temperatures from 50° C. to 300° C., preferably from 150° C. to 250° C. under autogenous pressures for a retention period of from about 1 hour to 7 days, preferably from 2 hours to 5 days. The product obtained by the above-mentioned process may be further subjected to conventional activation or modification treatment as needed. Accordingly, the crystalline aluminogallosilicate referred to herein may also include a variety of modified and/or activated products obtainable by the modification and/or activation treatments in addition to those producible by hydrothermal synthesis.

In the production of crystalline aluminogallosilicate by hydrothermal synthesis, the particle size of the product depends upon a lot of factors such as the kind of the silica source, the amount of organic additives (e.g. quaternary ammonium salt), the amount and kind of the inorganic salt to be used as a mineralizer, the amount of base in the gel, the pH of the gel, the temperature of the crystallization and the rate of stirring. By appropriately controlling these conditions, crystalline aluminogallosilicate having a particle size of about 0.05-20 μm with at least 80% by weight thereof having a particle size of 0.01-10 μm may be produced.

An MASNMR (Magic Angle Spinning Nuclear Magnetic Resonance) analysis may directly or indirectly give useful information on the elements present in the crystal structure of the crystalline aluminogallosilicate and on the composition thereof. For example, the $^{27}$Al-NMR analysis of a crystalline aluminosilicate gives information on aluminum of the tetrahedral configuration in the anionic skeletal structure. The $^{29}$Si-NMR analysis gives information on the four tetrahedra (TO$_4$; T=Al, Ga, Si) adjacent to the SiO$_4$ tetrahedron in the structure thereof. In the aluminogallosilicate according to the present invention, the $^{27}$Al-NMR and $^{71}$Ga-NMR analyses show that the Al and Ga elements of the tetrahedral configuration are present in the skeletal structure. From information provided by the $^{29}$Si-NMR analysis, the mole ratio of SiO$_2$ to (Al$_2$O$_3$+Ga$_2$O$_3$) in the crystal structure is computed. The results are in well conformity with those obtained from elementary analysis.

One of the chemical characteristics of the crystalline aluminogallosilicate is its acid property. Generally, the degree of acidity may be determined by means of the temperature programmed desorption of the measurement for heat of adsorption using basic substance such as ammonia or pyridine. As the degrees of acidity balancing the aluminum and gallium used for synthesis are measured in the aluminogallosilicates, it is apparent that the aluminum and gallium are present in the anionic skeletal structure of the crystal structure.

The crystalline aluminogallosilicate to be used as a catalyst component in the process of the present invention is characterized in that the skeletal structure thereof has an aluminum content of 0.1-2.5% by weight and a gallium content of 0.15-5 % by weight. The aluminogallosilicate has a SiO$_2$/(Al$_2$O$_3$+Ga$_2$O$_3$) molar ratio of 17-606, preferably 28-110, a SiO$_2$/Al$_2$O$_3$ molar ratio of 32-870, preferably 45-140 and a SiO$_2$/Ga$_2$O$_3$ molar ratio of 36-2,000, preferably 80-500 and preferably has a composition represented by the following formula in terms of molar ratios of the oxides when calcined at 500° C. or higher:

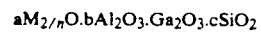

$$aM_{2/n}O.bAl_2O_3.Ga_2O_3.cSiO_2$$

wherein M represents a metal selected from the group consisting of alkali metals, alkaline earth metals and mixtures thereof, n represents the valence of said metal M, a is a positive number of (b+1)±3, preferably (b+1)±2, b is a number of 0.04-62.5, preferably 1.0-6.0 and c is a number of 36-2,000, preferably 80-500 and wherein at least a portion of said metal M is optionally replaced by proton.

Most preferably crystalline aluminogallosilicates are of the MFI type and/or of the MEL type. The MFI type and MEL type silicates belong to the structural type of the known zeolites of the kind published in "The Structure Commission of the International Zeolite Association" (Atlas of Zeolite Structure Types, W. M. Meiyer and D. H. Olson (1978), Distributed by Polycrystal Book Service, Puttsburg, Pa., U.S.A.).

The particle size of the crystalline aluminogallosilicate to be used in the present invention is about 0.05-20 μm. It is important that at least 80% by weight of the crystalline aluminogallosilicate should have a particle size of 0.1-10 μm in order for the catalyst to exhibit a desired activity retentivity and other catalytic activities. Preferably at least 80% by weight of the crystalline aluminogallosilicate has a particle size of 0.5-5 μm, more preferably 1-3 μm. The crystalline aluminogallosilicate is in the form of aggregated particles (secondary particles) composed of primary particles having a particle size of about 0.02-2 μm.

When the crystalline aluminogallosilicate is prepared by hydrothermal synthesis, it is preferably to use a crystallization temperature of at least 140° C., more preferably 150°-250° C. for reasons of obtaining high catalytic activity. A crystallization temperature of below 140° C. is economically disadvantageous because a long crystallization time is required for obtaining similar effects. Additionally, it is not recommendable to maintain the reaction mixture in the hydrothermal synthesis conditions for a long period of time, since the zeolite crystal phase is in a quasi-stable state in such an environment so that there is an increased danger of contamination with undesirable phases.

When the particle size of the aluminogallosilicate exceeds 20 μm, distribution of Si, Al and Ga crystallites becomes ununiform, resulting in deterioration of catalytic activity thereof. Further, since a diffusion rate of reactant molecules in pores of the zeolite structure, which pores have the same diameter as that of the molecules, is slow, the reactant molecules are hard to access to catalytically active sites located in the depth of the pores when the particle size exceeds 20 μm. Thus, the active sites are not effectively used for the conversion reaction. Moreover, deposition of coke on outer surfaces of the catalyst causes clogging of the pores of the silicate, so that active sites in the depth of the pores are not effectively used. Reduction of the yield and selectivity in the case of the catalyst with the large particle size aluminogallosilicate is considered to be attributed to the above.

The catalytic activity of the aluminogallosilicate also depends on the composition thereof. In order to obtain high catalytic activity, it is important that the aluminogallosilicate should contain, in its skeletal structure, 0.1-2.5% by weight, preferably 0.1-2.0% by weight of aluminum, 0.1-5.0% by weight, preferably 0.1-2.5% by weight of gallium. It is also preferred that the silicate have a $SiO_2/T_2O_3$ ($T_2O_3 = Al_2O_3 + Ga_2O_3$) molar ratio of 28-110 for reasons of good retentivity of high catalytic activity for a long period of time.

The above crystalline aluminogallosilicate is used in the form of a mixture with a binder as a catalyst for the production of high-octane gasolines. The binder serves to improve mechanical properties such as strength, wear resistance and moldability. Illustrative of suitable binders are alumina, silica, aluminaboria, silicaalumina and the like inorganic oxides. The content of the binder in the catalyst is generally 10-70% by weight. Addition of phosphorus to these inorganic binders can further improve mechanical strengths of the molded catalysts.

A mixture of the silicate and the binder is formulated as a cylindrical shape, a granule, a sphere, a sheet, a pellet or the like shape by means of extrusion molding, spray drying, tableting press, tumbling or an oil drop method. To facilitate the molding, an organic lubricant may be advantageously used.

The aluminogallosilicate catalyst may be subjected to activation treatments commonly adopted for conventional zeolite catalysts, as desired. For example, the silicate catalyst may be converted into an ammonium form by ion exchange in an aqueous solution containing an ammonium salt such as ammonium chloride, ammonium nitrate or the like. The ammonium-form catalyst may further subjected to ion exchange treatment or impregnation treatment in an aqueous solution containing ions of a desired metal other than alkali metals and alkaline earth metals for the introduction of the desired metals into the catalyst. The aluminogallosilicate catalyst in the ammonium form may also be converted into an acid form by calcination in the atmosphere of air, nitrogen or hydrogen at 200°-800° C., preferably 350°-700° C. for 3-24 hours. The above activation treatment is generally performed for the catalyst prior to the initiation of the catalytic conversion of a light hydrocarbon raw material into high-octane gasolines. Alternatively, the treatment may be carried out for the alumino-gallosilicate which has not yet been molded with a binder into a desired shape.

The aluminogallosilicate catalyst in the proton form is advantageously used. The proton type catalyst may further contain, as an auxiliary catalytic component, one or metals capable of improving dehydrogenation activity or of preventing coke deposition. Examples of the auxiliary catalytic metal include magnesium, calcium strontium, barium, lanthanum, cerium, titanium, vanadium, chromium, molybdenum, tungsten, manganese, rhenium, iron, ruthenium, cobalt, rhodium, iridium, nickel, palladium, platinum, copper, silver, tin, aluminum, indium, germanium, zinc, gallium lead, phosphorus, antimony, bismuth and selenium. These metals may be used singly or in combination of two or more.

The amount of the auxiliary metal to be supported on the catalyst is generally 0.01-10% by weight in terms of elemental metal. The supported catalyst may be prepared by any known method such as ion-exchange or impregnation. The auxiliary metal component may be incorporated into the catalyst by supporting the metal component on the binder with which the aluminogallosilicate is to be molded or on the molded catalyst. Further, the auxiliary metal component may be added in a reaction mixture for the preparation of crystalline aluminogallosilicate.

Illustrative of suitable auxiliary metals which are effective to prevent coke deposition are magnesium, calcium, lanthanum, cerium, ruthenium, iridium. The metal component is generally used in an amount of 0.01-5% by weight in terms of elemental metal.

The conversion of a light hydrocarbon into high-octane gasoline is carried out by contacting the light hydrocarbon with the above aluminogallosilicate catalyst at a temperature of 350°-650° C. under a partial hydrogen pressure of 5 kg/cm² or less.

Reaction temperatures to be used in the conversion reaction of the light hydrocarbons according to the present invention may be determined depending upon the composition of the light hydrocarbon serving as the row material, the desired yield of the high-octane gasoline and so on, but they range preferably from 350° to 650° C. If the reaction temperatures are lower than 350° C., the production of by-products such as light gases, e.g. methane and ethane, can be prevented, but the yields of the high-octane gasoline are decreased. If the reaction temperatures are higher than 650° C., the yield of the high-gasoline can be increased but the catalytic deactivation may be accelerated by means of coke or the like, thereby reducing the life of the catalyst. The reaction temperatures may range more preferably from 450° C. to 650° C. for the light hydrocarbons containing a n-paraffin as a major constituent, from 400° C. to 600° C. for the light hydrocarbons containing an isoparaffin as a major constituent, and from 350° C. to 550° C. for the light hydrocarbons containing an olefin as a major constituent.

In the conversion process described above, high pressures are not particularly required because a sufficient yield of the high-octane gasoline can be attained under ambient pressures. However, if the reactants contain a large quantity of light gases such as ethane or propane or in instances where a by-product, hydrogen or propane or butane is used as an LPG, it is economically advantageous to use elevated pressures as high as about 20 kg/cm$^2$. As reactions including the dehydrogenation proceed in the conversion of the light hydrocarbons to the high-octane gasoline, the hydrogen partial pressures balancing the reaction can be attained under reaction conditions without an addition of hydrogen. An intentional addition of hydrogen may have the advantages that the coke accumulation can be prevented and the catalyst life can be prolonged, but it is not necessarily advantageous because an increase of the hydrogen partial pressure may radically decrease the yields of the high-octane gasoline. It is accordingly preferred to restrict the hydrogen partial pressures to 5 kg/cm$^2$ or lower.

The resulting high-octane gasoline-containing product is discharged from the reaction zone and is introduced into a separation zone for the recovery of high-octane gasoline therefrom. In this case, it is preferred that a light fraction containing methane and/or ethane as a major component be separated from the high-octane gasoline-containing product and recycled to the reaction zone as part of the light hydrocarbon raw material feed, for reasons of prevention of coke deposition on the catalyst and of maintenance of high aromatic yield for a long period of time. The recycling of the light fraction is effective not only in the above-described process using the above specific crystalline aluminogallosilicate catalyst but also in other processes using conventional aluminogallosilicates. The amount of the light fraction to be recycled to the reaction zone is generally 0.5-3 parts by weight per part by weight of the fresh, light hydrocarbon raw material feed.

The catalytic conversion may be performed using a fixed bed system, a moving bed system or a fluidized bed system. The feed rate of the light hydrocarbon raw material feed is generally 100-10,000 hour$^{-1}$, preferably 100-2,000 hour$^{-1}$ in terms of gas space velocity when a fixed bed system is adopted. In the case of other systems, the contact time is determined so as to obtain similar effect.

During the catalytic conversion process, the crystalline aluminogallosilicate catalyst is gradually deactivated. Such a deactivated catalyst may be heated to 200°-800° C., preferably 350°-700° C. in the atmosphere of air, nitrogen or hydrogen for activation and regeneration purposes. This heat treatment may be performed in the reactor or in a separate regeneration zone.

Accordingly to the process of the present invention, high-octane gasolines may be obtained with both a high yield and a high selectivity while suppressing coke deposition thereon. The catalyst has a prolonged catalyst life and can retain its high aromatics yield for a long period of continuous process time. Thus, the productivity of high-octane gasolines attained by the present invention per unit catalyst amount is significantly increased.

The crystalline aluminogallosilicates according to the present invention may also be used as a catalysts for isomerization, alkylation, or disproportionation of hydrocarbons and aromatization of methanol by utilizing their properties as solid acids. Because of their dehydrogenative activity, the catalysts may be used for the preparation of light olefins, for example, for the production of propylene by dehydrogenation of propane. They also may be used as adsorbents by utilizing their physical adsorptive characteristics.

The following examples will further illustrate the present invention.

EXAMPLE 1

Preparation of Aluminogallosilicates

A total number of 11 crystalline aluminogallosilicates (AGS-1 through AGS-11) were prepared in accordance with the following procedures.

A solution (I) was prepared from sodium silicate (J SODIUM SILICATE #3; 28-30% by weight of SiO$_2$, 9-10% by weight of Na$_2$O, balance water; product of Nippon Kagaku Kogyo K. K.) in the amount shown under the column q-1 in Table 1 below and water in the amount shown under the column q-2. Another solution (II) was prepared from Al$_2$(SO$_4$)$_3$.14-18H$_2$O in the amount shown under the column q-3 in Table 3, Ga(NO$_3$)$_3$.nH$_2$O (Ga: 18.51%) in the amount shown under the column q-4, tetrapropylammonium bromide in the amount shown under the column q-5, H$_2$SO$_4$ (97% by weight) in the amount shown under the column q-6, NaCl in the amount shown under the column q-7 and water in the amount shown under the column q-8.

The solution (II) was gradually poured into the solution (I) with stirring at room temperature, and the mixture was vigorously stirred with a mixer for 5-15 minutes to finely divide the gel and to obtain a milky mixture. This was placed in a stainless steel autoclave and subjected to crystallization under autogenous pressure at the temperature shown in Table 1 for the period of time shown in Table 1 and at the stirring speed (revolution speed) shown in Table 1. The resultant mixture was filtered to obtain a solid product. The solids were washed five times with 5 liter portion of water and then dried at 120° C., followed by calcination at 650° C. for 3 hours in the atmosphere of air. The calcined products (crystalline aluminogallosilicates AGS-1 through AGS-11) were analyzed by X-ray diffraction and found to be of the MFI structure type. The particle sizes and molar compositions of the calcined products were as summarized in Table 2.

TABLE 1

| Alumino-gallo-silicate | Composition of Aqueous Mixture (parts by weight) | | | | | | | | Reaction Condition | | |
|---|---|---|---|---|---|---|---|---|---|---|---|
| | q-1 | q-2 | q-3 | q-4 | q-5 | q-6 | q-7 | q-8 | Temperature (°C.) | Time (Hr.) | Revolution speed (rpm) |
| AGS-1 | 1706.1 | 2227.5 | 64.2 | 32.8 | 368.0 | 153.0 | 653.1 | 2975.7 | 160 | 72 | 100 |
| AGS-2 | 1706.1 | 2227.5 | 64.2 | 31.8 | 368.0 | 153.0 | 326.6 | 2975.7 | 180 | 72 | 30 |
| AGS-3 | 1706.1 | 2227.5 | 64.2 | 32.8 | 369.2 | 152.1 | 326.6 | 2975.7 | 180 | 72 | 100 |
| AGS-4 | 1706.1 | 2227.5 | 64.2 | 32.8 | 369.2 | 152.1 | 326.6 | 2975.7 | 180 | 72 | 300 |
| AGS-5 | 853.0 | 1113.8 | 32.1 | 16.4 | 184.6 | 76.1 | 163.3 | 1487.8 | 155 | 72 | 30–100 |
| AGS-6 | 426.5 | 556.9 | 32.1 | 8.2 | 156.8 | 30.4 | 81.6 | 743.9 | 180 | 139 | 100 |
| AGS-7 | 426.5 | 556.9 | 16.0 | 16.4 | 119.3 | 34.9 | 163.3 | 743.9 | 180 | 72 | 10 |
| AGS-8 | 1706.1 | 2227.5 | 64.2 | 32.8 | 369.2 | 152.1 | 326.6 | 2975.7 | 180 | 72 | 30–300 |
| AGS-9 | 426.5 | 556.9 | 16.0 | 8.0 | 92.0 | 38.2 | 163.3 | 743.9 | 180 | 120 | — |
| AGS-10 | 426.5 | 556.9 | 32.1 | 8.2 | 156.8 | 30.4 | 163.3 | 743.9 | 180 | 120 | — |
| AGS-11 | 426.5 | 556.9 | 16.0 | 16.4 | 119.3 | 34.9 | 163.3 | 743.9 | 180 | 120 | — |

TABLE 2

| Alumino-gallo-silicate | Composition of Aluminogallosilicate (molar ratio) | | | Particle Size ($\mu$m) | Particle size distribution* ($\mu$m) | Catalyst Number |
|---|---|---|---|---|---|---|
| | $SiO_2/Al_2O_3$ | $SiO_2/Ga_2O_3$ | $SiO_2/(Al_2O_3 + Ga_2O_3)$ | | | |
| AGS-1 | 65.9 | 186.8 | 48.7 | 0.1–10 | 1–4 | I |
| AGS-2 | 66.4 | 186.4 | 49.0 | 0.1–20 | 1–10 | II |
| AGS-3 | 73.0 | 185.0 | 52.4 | 0.1–5 | 0.5–5 | III |
| AGS-4 | 64.8 | 193.2 | 48.6 | 0.1–5 | 0.1–3 | IV |
| AGS-5 | 72.0 | 163.2 | 50.0 | 0.1–10 | 1–7 | V |
| AGS-6 | 38.0 | 174.4 | 31.2 | 0.1–18 | 2–10 | VI |
| AGS-7 | 71.0 | 83.2 | 38.4 | 0.1–20 | 1–10 | VII |
| AGS-8 | 76.6 | 184.4 | 54.2 | 0.2–10 | 1–7 | VIII |
| AGS-9 | 74.2 | 163.4 | 51.0 | 0.1–30 | 20–25 | IX |
| AGS-10 | 37.8 | 172.2 | 31.0 | 0.1–30 | 20–25 | X |
| AGS-11 | 68.8 | 74.8 | 35.8 | 0.1–30 | 20–25 | XI |

*Particle size range of that protion of the crystalline aluminogallosilicate which accounts for 80% by weight of the crystalline aluminogallosilicate.

EXAMPLE 2

Preparation of Catalysts

The crystalline aluminogallosilicates AGS-1 through AGS-11 obtained in Example 1 were processed to form proton-type catalysts I through XI in the manner as follows. The aluminogallosilicate was mixed with alumina powder as a binder (Cataloid AP, product of Shokubai Kasei Kogyo K. K.) to obtain a mixture having a weight ratio of the silicate to the alumina of about 65:35. After addition of water, the mixture was kneaded, extruded to cylindrical shape, dried at 120° C. for 3 hours and calcined at 600° C. for 3 hours. The resulting calcined body was mixed with about 2N ammonium nitrate aqueous solution in a proportion of 5 ml per 1 g of the calcined body and the mixture was heated at 100° C. for 2 hours for ion-exchange purposes. This ion-exchange treatment was repeated 3 more times, thereby to obtain an $NH_4{}^+$-form catalyst. Then, the $NH_4{}^+$-form catalyst was calcined at 600° C. for 3 hours in the atmosphere of air to obtain the hydrogen-form catalyst. The relationship between the crystalline aluminogallosilicates AGS-1 through AGS-11 and the proton-type catalysts I thropugh XI is as shown in Table 2.

EXAMPLE 3

Conversion of n-Hexane

Using each of the hydrogen-form catalysts I through XI obtained in Example 2, conversion of n-hexane was conducted in a flow reactor at a temperature of 538° C., a pressure of 1 atm and a liquid hourly space velocity (LHSV) of 2 hour$^{-1}$ for 24 hours with an amount of the catalyst of 3 ml (16–28 mesh pass). The resultant products were analyzed by a gas chromatograph connected to the reactor. The results are shown in Table 3. The amounts of carbon deposits on the catalysts I, II, III, IV and VIII were found to be 11.0, 12.1, 8.9, 10.6 and 10.7% by weight, respectively based on catalyst. The "activity retentivity" in Table 3 is defined as follows:

$$\text{Activity retentivity} = \frac{\text{Aromatics yield after 24 hours}}{\text{Aromatics yield after 4 hours}} \times 100 \, (\%)$$

TABLE 3

| Catalyst | | Process time (hr) | | | | | | Activity Retentivity (%) |
|---|---|---|---|---|---|---|---|---|
| | | 1 | 4 | 10 | 16 | 22 | 24 | |
| I | Conversion (%) | 100 | 100 | 100 | 100 | — | 100 | |
| | Yield of Aromatic Hydrocarbon | 61.1 | 59.6 | 58.5 | 56.2 | — | 53.7 | 90.1 |
| II | Conversion (%) | 100 | 100 | 100 | 100 | 100 | 100 | |
| | Yield of Aromatic Hydrocarbon | 61.3 | 60.5 | 57.4 | 53.6 | 49.6 | 48.3 | 79.8 |
| III | Conversion (%) | 100 | 100 | 100 | 100 | 100 | 100 | |
| | Yield of Aromatic Hydrocarbon | 62.9 | 61.9 | 60.3 | 59.0 | 57.4 | 56.8 | 91.8 |
| IV | Conversion (%) | 100 | 100 | 100 | 100 | 100 | 100 | |
| | Yield of Aromatic Hydrocarbon | 61.0 | 60.9 | 60.4 | 58.7 | 57.1 | 57.0 | 93.6 |
| V | Conversion (%) | 100 | 100 | 100 | 100 | 99.9 | 99.9 | |
| | Yield of Aromatic Hydrocarbon | 64.5 | 60.7 | 57.5 | 54.7 | 50.0 | 48.1 | 79.2 |

TABLE 3-continued

| Catalyst | | Process time (hr) | | | | | | Activity Retentivity (%) |
|---|---|---|---|---|---|---|---|---|
| | | 1 | 4 | 10 | 16 | 22 | 24 | |
| VI | Conversion (%) | 100 | 100 | 100 | 100 | 100 | 100 | |
| | Yield of Aromatic Hydrocarbon | 64.9 | 63.0 | 61.9 | 57.6 | 54.9 | 54.0 | 85.7 |
| VII | Conversion (%) | 100 | 100 | 100 | 98.3 | 97.1 | 96.4 | |
| | Yield of Aromatic Hydrocarbon | 68.0 | 67.2 | 63.2 | 56.1 | 46.9 | 45.7 | 68.0 |
| VIII | Conversion (%) | 100 | 100 | 100 | 100 | 100 | 100 | |
| | Yield of Aromatic Hydrocarbon | 63.5 | 60.3 | 58.6 | 56.1 | 53.1 | 52.0 | 86.2 |
| IX | Conversion (%) | 100 | 100 | 100 | 98.6 | 96.0 | 93.2 | |
| | Yield of Aromatic Hydrocarbon | 63.2 | 59.9 | 57.0 | 47.6 | 41.3 | 39.0 | 65.1 |
| X | Conversion (%) | 100 | 100 | 100 | 100 | 98.5 | 97.0 | |
| | Yield of Aromatic Hydrocarbon | 63.6 | 62.3 | 57.4 | 52.8 | 44.4 | 41.8 | 67.1 |
| XI | Conversion (%) | 100 | 100 | 100 | 95.8 | 84.0 | 80.0 | |
| | Yield of Aromatic Hydrocarbon | 70.0 | 69.7 | 61.8 | 47.1 | 33.4 | 30.1 | 43.2 |

From the above results, it will be apparent that the yield of aromatic hydrocarbons depends on the particle size distribution of the crystalline aluminogallosilicate and is high when 80% by weight thereof has a particle size in the range of 0.1-10 μm. The catalyst XI, for example, in which the content of the aluminogallosilicate having a particle size of 0.1-30 μm is 80% by weight based on the total weight of the aluminogallosilicate, namely the aluminogallosilicate having a particle size of 0.1-10 μm does not amount to 80% by weight fails to give desired results. Thus, the catalyst according to the present invention is effective to minimize the deposition of carbon on the catalyst and to improve the catalyst life while maintaining high conversion and high yield for a long continuous process time.

EXAMPLE 4

Influence of Crystallization Temperature

Aluminogallosilicates AGS-12 to 15 were prepared in the same manner as described in Example 1 except that the crystallization temperature was varied as shown in Table 4. The properties of the silicates are also shown in Table 4. Using these silicates, catalysts XII-XV were prepared in the same manner as that in Example 2. Then, conversion of n-hexane was performed in the same manner as that in Example 3. The results are summarized in Table 5.

From the results shown in Table 5, the catalytic performance also depends upon the temperature at which the crystalline aluminogallosilicate was prepared. Good results are obtained when the crystallization temperature is at least 140° C., especially at least 150° C.

TABLE 4

| Alumino-gallo-silicate | Composition of Aluminogallosilicate (molar ratio) | | | Crystallization temperature (°C.) | Particle size (μm) | Particle size distribution* (μm) | Catalyst Number |
|---|---|---|---|---|---|---|---|
| | $SiO_2/Al_2O_3$ | $SiO_2/Ga_2O_3$ | $SiO_2/(Al_2O_3 + Ga_2O_3)$ | | | | |
| AGS-12 | 63.4 | 183.9 | 47.4 | 130 | 0.1-10 | 1-5 | XII |
| AGS-13 | 65.3 | 188.0 | 48.5 | 140 | 0.1-10 | 1-5 | XIII |
| AGS-14 | 76.8 | 167.6 | 52.6 | 150 | 0.1-10 | 1-7 | XIV |
| AGS-5 | 72.0 | 163.2 | 50.0 | 155 | 0.1-10 | 1-7 | V |
| AGS-2 | 66.4 | 186.4 | 49.0 | 180 | 0.1-20 | 1-10 | II |
| AGS-15 | 63.2 | 149.3 | 44.4 | 200 | 0.1-20 | 1-10 | XV |

*Particle size range of that protion of the crystalline aluminogallosilicate which accounts for 80% by weight of the crystalline aluminogallosilicate.

TABLE 5

| Catalyst | | Process time (hr) | | | | | | Activity Retentivity (%) |
|---|---|---|---|---|---|---|---|---|
| | | 1 | 4 | 10 | 16 | 22 | 24 | |
| XII | Conversion (%) | 100 | 100 | 100 | 99.3 | 94.8 | 90.0 | |
| | Yield of Aromatic Hydrocarbon | 61.8 | 57.7 | 53.2 | 44.3 | 37.0 | 34.0 | 58.9 |
| XIII | Conversion (%) | 100 | 100 | 100 | 99.7 | 99.8 | 97.9 | |
| | Yield of Aromatic Hydrocarbon | 63.0 | 58.8 | 56.5 | 49.3 | 49.5 | 43.0 | 73.1 |
| XIV | Conversion (%) | 100 | 100 | 100 | 99.9 | 99.9 | 99.7 | |
| | Yield of Aromatic Hydrocarbon | 62.0 | 58.0 | 56.1 | 48.3 | 45.6 | 44.4 | 76.6 |
| V | Conversion (%) | 100 | 100 | 100 | 100 | 100 | 100 | |
| | Yield of Aromatic Hydrocarbon | 64.5 | 60.7 | 57.5 | 54.7 | 50.0 | 48.1 | 79.2 |
| II | Conversion (%) | 100 | 100 | 100 | 100 | 100 | 100 | |
| | Yield of Aromatic Hydrocarbon | 61.3 | 60.5 | 57.4 | 53.6 | 49.6 | 48.3 | 79.8 |
| XV | Conversion (%) | 100 | 100 | 100 | — | 99.6 | 100 | |
| | Yield of Aromatic Hydrocarbon | 67.6 | 67.3 | 63.8 | — | 55.3 | 53.4 | 79.3 |

EXAMPLE 5

Conversion of Butane

Using each of the hydrogen-form catalysts I, II and VIII obtained in Example 2, conversion of n-butane was conducted in a flow reactor at a temperature of 538° C., a pressure of 1 atm and a gas hourly space velocity (GHSV) of 450 hour$^{-1}$ for 24 hours with an amount of the catalyst of 3 ml (16-28 mesh pass). The resultant products were analyzed by a gas chromatograph connected to the reactor. The results are shown in Table 6. From the results shown in Table 6, a small diameter of the aluminogallosilicate can maintain a high yield of aromatic hydrocarbons for a long period of continuous process time.

TABLE 6

| Catalyst | | Process time (hr) | | | | | | Activity Retentivity (%) |
|---|---|---|---|---|---|---|---|---|
| | | 1 | 4 | 10 | 16 | 22 | 24 | |
| I | Conversion (%) | 99.8 | 99.5 | 97.6 | 92.8 | 86.7 | 85.2 | |
| | Yield of Aromatic Hydrocarbon | 53.3 | 50.6 | 47.8 | 43.7 | 39.2 | 38.2 | 75.5 |
| II | Conversion (%) | 99.8 | 99.6 | 98.4 | 95.6 | 91.0 | 89.4 | |
| | Yield of Aromatic Hydrocarbon | 57.2 | 54.4 | 51.4 | 47.7 | 43.4 | 42.1 | 77.4 |
| VIII | Conversion (%) | 99.5 | 98.8 | 96.6 | 93.9 | 90.2 | 88.2 | |
| | Yield of Aromatic Hydrocarbon | 54.5 | 53.6 | 51.2 | 48.5 | 45.5 | 44.1 | 82.3 |

EXAMPLE 6

Recycling of Light Fraction

Using the catalyst VIII obtained in Example 2, conversion of light naphtha was performed in a flow reactor while feeding a light fraction to the light naphtha feed in a proportion of 1 part by weight per 1 part by weight of the light naphtha (recycling ratio of 1). The light naphtha has an initial boiling point of 36° C., an end boiling point of 91° C., a specific gravity of 0.659 and a sulfur content of 450 ppm. The light fraction consisted of 8% by volume of hydrogen, 57% by volume of methane, 25% by volume of ethane and 10% by volume of propane. The conversion was carried out at a temperature of 538° C., a pressure of 1 kg/cm$^2$G and a liquid hourly space velocity (LHSV) of 1.5 hour$^{-1}$ for 24 hours with an amount of the catalyst of 3 ml (16-28 mesh pass). The resultant products were analyzed by a gas chromatograph connected to the reactor. The results are shown in Table 7 as Experiment A.

For the purpose of comparison, the above conversion was performed in the same manner as described except that the light fraction was not fed. The results are shown in Table 7 as Experiment B. The results shown in Table 7 indicate that the recycling of the light fraction is effective in maintaining a high aromatics yield for a long period of continuous process time and in suppressing deposition of coke on the catalyst.

EXAMPLE 7

Recycling of Light Fraction

Using the catalyst VIII obtained in Example 2, conversion of light naphtha was performed in a flow reactor while feeding a light fraction to the light naphtha feed in a proportion of 1 part by weight per 1 part by weight of the light naphtha (recycling ratio of 1). The light naphtha has an initial boiling point of 36° C., an end boiling point of 91° C., a specific gravity of 0.659 and a sulfur content of 450 ppm. The light fraction consisted of 8% by volume of hydrogen, 57% by volume of methane, 25% by volume of ethane and 10% by volume of propane. The conversion was carried out at a temperature of 538° C., a pressure of 5 kg/cm$^2$G and a liquid hourly space velocity (LHSV) of 1.5 hour$^{-1}$ for 47-48 hours with an amount of the catalyst of 250 ml (16-28 mesh pass). The resultant products were analyzed by a gas chromatograph connected to the reactor. The results are shown in Table 8 as Experiment A.

For the purpose of comparison, the above conversion was performed in the same manner as described except that the light fraction was not fed. The results are shown in Table 8 as Experiment B. The results shown in Table 8 indicate that the recycling of the light fraction is effective in maintaining a high aromatics yield for a long period of continuous process time and in suppressing coke deposition on the catalyst.

TABLE 8

| Experiment | | Process time (hr) | | | | | | Amount of carbon deposit on catalyst (wt %) |
|---|---|---|---|---|---|---|---|---|
| | | 4.5 | 14 | 23 | 28.5 | 38 | 47 | |
| A | Conversion (%) | 100 | 100 | 100 | 100 | 100 | 100 | 21.0 |
| | Yield of Aromatic Hydrocarbon | 58.9 | 58.6 | 58.7 | 57.3 | 56.5 | 56.6 | |
| | | Process time (hr) | | | | | | |
| | | 3 | 14 | 23.5 | 27 | 38 | 47.5 | |
| B | Conversion (%) | 100 | 100 | 100 | 100 | 100 | 100 | 22.0 |
| | Yield of Aromatic Hydrocarbon | 53.4 | 54.2 | 54.9 | 54.3 | 53.0 | 52.5 | |

EXAMPLE 8

Activation Treatment of Catalyst

1. Deactivation

The catalyst VIII (7 ml) obtained in Example 2 was packed in a flow reactor and subjected to repeated coking and decoking treatment conditions (total 45 repetitions). About 20% by weight of coke was found to

TABLE 7

| Experiment | | Process time (hr) | | | | | | Amount of carbon deposit on catalyst (wt %) |
|---|---|---|---|---|---|---|---|---|
| | | 1 | 4 | 10 | 16 | 22 | 24 | |
| A | Conversion (%) | 100 | 100 | 100 | 100 | 100 | 100 | |
| | Yield of Aromatic Hydrocarbon | 63.8 | 63.5 | 61.8 | 60.1 | 57.5 | 56.9 | 11.1 |
| B | Conversion (%) | 100 | 100 | 100 | 100 | 100 | 100 | |
| | Yield of Aromatic Hydrocarbon | 56.1 | 55.1 | 54.4 | 55.1 | 53.0 | 53.0 | 13.1 | deposit on the catalyst after each of the coking treatments and the coke deposit was found to be completely removed after each of the decoking treatments.

The coking treatment was performed by passing a mixed feed containing n-heptane and toluene to through the catalyst in the reactor at a temperature of 538° C., a pressure of 0 kg/cm$^2$G and an LHSV of 3 hour$^{-1}$ for 13.5 hour. The decoking treatment was performed after each of the coking treatments by feeding a regeneration gas (air: 40%, nitrogen 60%) at a rate of 1000 STPml/mlcat.h and a pressure of 0 kg/cm²G for a period of time of 4.5 hours at 500° C., 0.5 hour at increasing temperatures from 500°-570° C. and 2.75 hours at 570° C.

With the repeated coking and decoking treatments, the catalytic activity became gradually deteriorated.

2. Activation

The deteriorated catalyst after the above repeated coking and decoking treatments was subjected to an activation treatment by passing dry hot air through the catalyst at a temperature of 695° C. for 16 hours.

3. Evaluation

The above-described deteriorated catalyst (Experiment A) and the activated catalyst (Experiment B) were each subjected to conversion reaction of n-hexane in the same manner as that in Example 2. The results are shown in Table 9, from which it will be appreciated that the activation treatment is effective in improving the catalyst performance of the deteriorated catalyst.

TABLE 9

| Experiment | | Process time (hr) | | | | | |
|---|---|---|---|---|---|---|---|
| | | 1 | 4 | 10 | 16 | 22 | 24 |
| A | Conversion (%) | 100 | 100 | 100 | 100 | 100 | 100 |
| | Yield of Aromatic Hydrocarbon | 54.0 | 53.3 | 51.9 | 50.0 | 48.4 | 47.7 |
| B | Conversion (%) | 100 | 100 | 100 | 100 | 100 | 100 |
| | Yield of Aromatic Hydrocarbon | 59.8 | 58.4 | 58.0 | 57.1 | 55.8 | 55.2 |

What is claimed is:

1. A process for the production of a high-octane gasoline, wherein a light hydrocarbon containing one or more paraffins and/or olefins, each having 2 to 7 carbon atoms, is contacted in a reaction zone with a catalyst containing a crystalline aluminogallosilicate at a temperature of 350°-650° C. under a hydrogen partial pressure of not higher than 5 kg/cm², thereby obtaining a high-octane gasoline-containing product, characterized in that said crystalline aluminogallosilicate has a particle size in the range of about 0.1-10.0, that at least 80% by weight of said crystalline aluminogallosilicate has a particle size in the range of 0.1-5.0 μm, and that said crystalline aluminogallosilicate contains about 0.1-2.5% by weight of aluminum and about 0.1-5% by weight of gallium in the skeleton thereof.

2. A process as claimed in claim 1, wherein the skeleton of said aluminogallosilicate has a SiO₂/Ga₂O₃ molar ratio of 80-500, a SiO₂/(Al₂O₃+Ga₂O₃) molar ratio of 28-110 and a SiO₂/Al₂O₃ molar ratio of 45-140.

3. A process as claimed in claim 1, wherein at least 80% by weight of said aluminogallosilicate has a particle size of 0.5-5 μm.

4. A process as claimed in claim 1, wherein at least 80% by weight of said aluminogallosilicate has a particle size of 1-3 μm.

5. A process as claimed in claim 1, wherein said aluminogallosilicate is a product obtained by hydrothermally treating a homogeneous aqueous mixture containing a source of silica, a source of alumina and a source of gallia and having a pH of 8-13 at a temperature of 150°-250° C. with stirring until crystals of said aluminogallosilicate are formed.

6. A process as claimed in claim 1, wherein said aluminogallosilicate is a product obtained by inserting gallium or aluminum each into the skeletal structure of a crystalline aluminosilicate or a crystalline gallosilicate.

7. A process as claimed in claim 1, wherein said aluminogallosilicate has the following formula:

$aM_{2/n}O.bAl_2O_3.Ga_2O_3.cSiO_2$ wherein M represents a metal selected from the group consisting of alkali metals, alkaline earth metals and mixtures thereof, n represents the valence of said metal M, a is a positive number from (b+1)±3, b is a number of 0.04-62.5 and c is a number of 36-2,000, and wherein at least a portion of said metal M is optionally replaced by proton.

8. A process as claimed in claim 1, wherein said catalyst additionally contains one or more catalytic metal components.

9. A process as claimed in claim 1, wherein the high-octane gasoline contains aromatic hydrocarbons having 6-8 carbon atoms as a major component.

10. A process as claimed in claim 1, which further includes the steps of separating a light fraction containing methane and/or ethane as a major component from said high-octane gasoline-containing product, and recycling said light fraction to said reaction zone.

11. The process of claim 1 wherein said crystalline aluminogallosilicate has an activity retentivity of at least 90% when measured by passing n-hexane over said crystalline aluminogallosilicate at a temperature of 538° C., at a pressure of 1 atmosphere and with a liquid hourly space velocity of 2 hour⁻¹, said activity retentivity calculated as follows:

$$\text{Activity retentivity} = \frac{\text{Aromatics yield after 24 hours}}{\text{Aromatics yield after 4 hours}} \times 100(\%)$$

* * * * *

UNITED STATES PATENT AND TRADEMARK OFFICE
CERTIFICATE OF CORRECTION

PATENT NO. : 5,073,673
DATED : December 17, 1991
INVENTOR(S) : HIRABAYASHI et al PAGE 1 of 2

It is certified that error appears in the above-identified patent and that said Letters Patent is hereby corrected as shown below:

Column 4, line 27, "$^{27}$AL-NMR" should read --$^{27}$Al-NMR--; and line 50, "0.15-5 %" should read --0.1-5 %--.

Column 5, line 8, "Puttsburg," should read --Pittsburgh--.

Column 6, line 37, after "cium", insert a comma --,--.

Column 9, Table 2, in the footnote, "protion" should read --portion--.

Column 10, line 36, "thropugh" should read --through--.

Column 12, Table 4, in the footnote, "protion" should read --portion--.

UNITED STATES PATENT AND TRADEMARK OFFICE
CERTIFICATE OF CORRECTION

PATENT NO. : 5,073,673

DATED : December 17, 1991

INVENTOR(S) : HIRABAYASHI et al

It is certified that error appears in the above-identified patent and that said Letters Patent is hereby corrected as shown below:

Column 15, line 16, after "0.1-10.0" insert --μm--.

Signed and Sealed this

Eighth Day of June, 1993

Attest:

MICHAEL K. KIRK

Attesting Officer

Acting Commissioner of Patents and Trademarks